Patented May 30, 1933

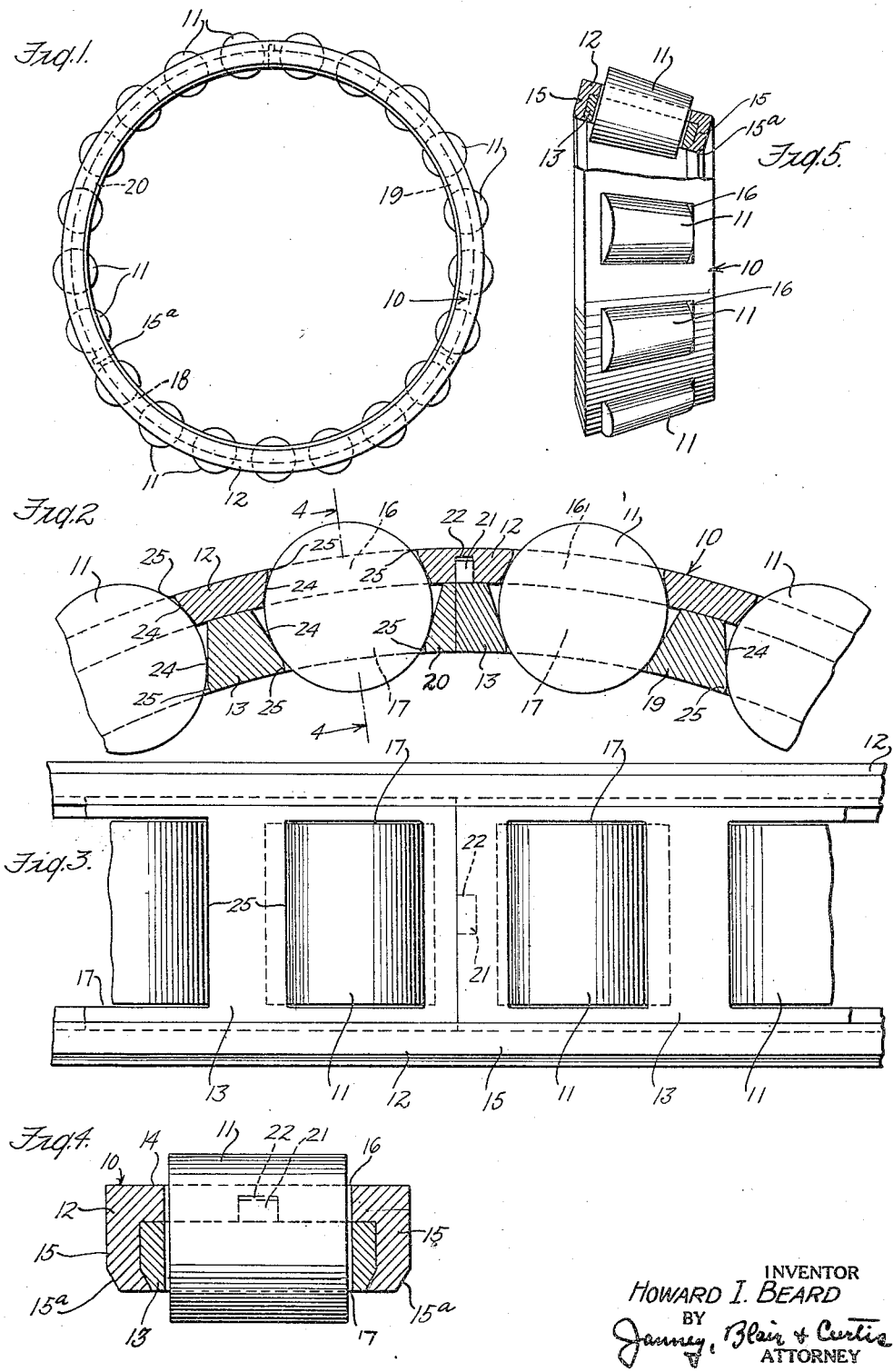

1,911,544

UNITED STATES PATENT OFFICE

HOWARD I. BEARD, OF DANBURY, CONNECTICUT

ANTIFRICTION BEARING

Application filed November 16, 1929. Serial No. 407,591.

This invention relates to the construction of anti-friction bearings but more particularly to bearings of the ball or roller type.

One of the objects of the invention is to provide a simple and durable anti-friction bearing construction which may be economically produced and which is strong and accurate.

Another object is to provide an advantageous form of cage construction which may be quickly and easily assembled and which is efficient and dependable in action. A further object is to provide the greatest possible number of rolls. Other objects will be in part obvious and in part pointed out hereinafter.

The invention accordingly consists in the features of construction, combination of elements and arrangements of parts, all as will be herein illustratively described and the scope of the application of which will be indicated in the following claims.

In the accompanying drawing, in which are shown the features of certain selected embodiments of this invention:

Fig. 1 is a side elevation of my bearing as assembled.

Fig. 2 is an enlarged central longitudinal sectional view of the bearing shown in Figure 1.

Fig. 3 is an enlarged fragmentary inside plan view of the bearing.

Fig. 4 is a transverse sectional view on the line 4—4 of Fig. 2, and

Fig. 5 is an elevation, partially in section of a modified form of bearing.

Referring to the drawing and particularly to Figs. 1 to 4 inclusive, there is shown an anti-friction bearing of the cylindrical type comprising a cage 10 in which are mounted a series of rolls 11. The cage 10 comprises an outer circular device 12 and an inner circular device 13.

The device 12 consists of a ring 14 having upon its opposite margins inwardly projecting flanges 15. These flanges 15 form with the inner face of the ring 14 a channel into which the inner device 13 fits. The devices 12 and 13 are provided with a series of spaced openings 16 and 17 respectively which register to form sockets for the corresponding rolls 11.

The device 13 is in the form of a ring which is capable of being deformed or contracted to enable it to be placed in position for insertion in the channel of the other member and then brought to shape or expanded into place. Different methods may be utilized to accomplish this end as for example by making the ring split or sectional. The ring may be made to snap into place by forming either the whole or a part thereof of resilient material. In the particular embodiment shown the device 13 is composed of three sections or segments 18, 19 and 20, the section 20 being resilient. When these sections are assembled their ends preferably substantially abut and by making their end faces in radial planes the sections interlock and are self retaining. A further interlock between the two devices may be provided by crimping inwardly or toward each other the inner edges of the flanges 15 as at 15a so that these edges will overlap the corresponding edges of the device 13. The overlapped edges of the device 13 may be bevelled.

A lug as 21 may be struck from or otherwise formed on one or each of the sections 18 to 20 to project into a corresponding recess 22 formed in the inner face of the outer device 12. These lugs act to position the inner device with respect to the outer device so that the roll openings will be in proper registration and to prevent relative rotary motion or creeping of these devices. In the pockets formed by the registering openings 16 and 17 the faces 24 are preferably tangential to the rolls whereas the faces 25 are radial, although they may be formed in any other suitable manner.

In the assembly of the bearing shown, the rolls are inserted in the openings in the outer device 12 and temporarily retained therein in any suitable manner. The sections or segments 18 and 19 of the inner device 13 are then inserted in the channel in the inner face of the outer member with the lugs 21 in their corresponding recesses. The third or resilient section 20 is deformed by pressing its ends one toward the other sufficiently to enable this section or segment to be inserted into its proper position within the channel in the outer device in the interval between the outer ends of the other two sections. When thus positioned, this segment is released and snaps into place. The inner device now coacts with the outer device to hold the rolls in position and the bearing is completely assembled. The outer device may be made of thinner metal than the inner one as the flanged edges thereof provide sufficient stiffness. If the edges of the flanges 15 are to be crimped in the manner described, this would be performed on one or both edges after the devices are assembled.

In Fig. 5 there is shown a conical bearing similar in construction to the cylindrical bearing already described. Here the circular devices 12 and 13 are substantially conical instead of cylindrical as in the previously described type and the rolls 11 are of like form. This bearing is assembled in substantially the same manner and is of the combined radial and thrust type.

It will be evident from the foregoing description that the principles of the invention are applicable to ball bearings as well as those of the roller type and the term "roll" is herein used in its broad sense to include balls or other suitable anti-friction elements for the same purpose. In a bearing embodying my invention it is possible to have the rolls close together as the intervening spaces may be small and thus a relatively large number of rolls may be used.

Therefore, it will be seen that there is provided a construction of an essentially practical nature in which the several objects of this invention are attained.

As many other embodiments may be made of the features of the above invention without departing from the scope of the invention, it is to be understood that all matter herein set forth or shown in the accompanying drawing is to be interpreted as illustrative and not in a limiting sense.

I claim:

1. In construction for anti-friction bearings, in combination, a circular device having a plurality of spaced openings, rolls disposed in said openings, and a second device interlocking within said first circular device to retain said rolls in said openings, said second device comprising sections adapted to be assembled in a general radial direction.

2. In construction for anti-friction bearings, in combination, a set of rolls, and a pair of interlocking circular devices respectively holding said rolls against inward and outward movement, one of said devices comprising sections adapted to abut one against the other to be held substantially against the other of said devices.

3. In construction for anti-friction bearings, in combination, a circular device having spaced openings about its surface, rolls disposed within said openings, a second circular device having a series of spaced openings adapted to register with the openings of said first device, said second device comprising sections of a resilient material adapted to be snapped into their permanent position and the walls of the registering openings cooperating to form sockets for the corresponding rolls.

4. In construction for anti-friction bearings, in combination, a flanged ring provided with a plurality of spaced openings, rolls in said openings, and a device fitting between the flanges on said ring for holding the rolls in said openings, said device comprising sections adapted to be snapped into their permanent retaining position.

5. In construction for anti-friction bearings, in combination, a flanged ring provided with a plurality of spaced openings, rolls in said openings, and a second ring fitting between the flanges on the first ring to hold the rolls in said openings, said second ring being provided with openings registering with the corresponding openings in the flanged ring to permit the rolls to project therethrough and comprising sections adapted to be snapped into permanent position after the insertion of said rolls.

6. In construction for anti-friction bearings, in combination, a flanged ring provided with a plurality of spaced openings, rolls in said openings, and a second ring comprising sections adapted to be snapped into permanent position, the ends thereof abutting to form a rigid whole, said second ring being provided with openings registering with the corresponding openings in the flanged ring to permit the rolls to project therethrough.

7. In construction for anti-friction bearings, in combination, a flanged ring provided with a plurality of openings, rolls in said openings, and means for holding the rolls in said openings comprising a sectional ring fitting within the flanged ring and between the flanges thereon.

8. In construction for anti-friction bearings, in combination, a flanged ring provided with a plurality of openings, rolls in said openings, and means for holding the rolls in said openings comprising a sectional ring fitting within the flanged ring and between the flanges thereon, one of the sections thereof being formed of resilient material.

9. In construction for anti-friction bearings, in combination, a flanged ring provided with a plurality of openings, rolls in said openings, and means for holding the rolls in said openings comprising a sectional ring fitting within the flanged ring and between the flanges thereon to permit assembly in a substantially radial direction, the sections being arranged substantially end to end with their abutting ends locking when assembled in the flanged ring.

10. In construction for anti-friction bearings, in combination, a set of rolls, and a pair of interlocking circular devices respectively holding said rolls against inward and outward movement, one of said devices being flanged to form a peripheral channel thereon into which the other device is inserted, said flanges extending over the corresponding marginal portions of said other device.

11. In construction for anti-friction bearings, in combination, a cylindrical member having inwardly directed flanges and spaced openings extending therethrough, a set of rolls disposed within said openings, and a split ring member fitting within said cylindrical member between said flanges and having openings corresponding to said first-mentioned openings within which said set of rolls may rest, said flanges overlapping the opposite edges of said ring to retain said ring in said position.

12. In construction for anti-friction bearings, in combination, a cylindrical member having inwardly directed flanges upon its opposite sides, said member having openings extending through its body portion, a set of rolls having a greater diameter than the width of said openings and disposed within said openings, and a split resilient ring member having openings corresponding to said first-mentioned openings and adapted to snap into position between said flanges against the body portion of said cylindrical member so that said rolls are partially disposed within said last-mentioned openings, said flanges extending inwardly over the opposite edges of said ring member.

13. In construction for anti-friction bearings, in combination, a cylindrical member having inwardly directed flanges upon its opposite sides, said member having openings extending through its body portion, a set of rolls having a greater diameter than the width of said openings and disposed within said openings, a split resilient ring member having openings corresponding to said first-mentioned openings and adapted to snap into position between said flanges against the body portion of said cylindrical member so that said rolls are partially disposed within said last-mentioned openings, said flanges extending inwardly over the opposite edges of said ring member, and means for preventing relative movement of said ring member and said cylindrical member.

14. In construction for anti-friction bearings, in combination, a cylindrical member having inwardly directed flanges upon its opposite sides, said member having openings extending through its body portion, the walls of which are beveled in an outward direction, a set of rolls having a larger diameter than said openings and resting against said walls, and a split resilient ring member adapted to be radially snapped into position between said flanges against the main body portion of said cylindrical member, said ring member having openings corresponding to said first-mentioned openings within which said rolls rest and said flanges extending inwardly over the edges of said ring member.

15. In construction for anti-friction bearings, in combination, a cylindrical member having inwardly directed flanges upon its opposite sides, said member having openings extending through its body portion, the walls of which are beveled in an outward direction, a set of rolls having a larger diameter than said openings and resting against said walls, a split resilient ring member adapted to be radially snapped into position between said flanges against the main body portion of said cylindrical member, said ring member having openings corresponding to said first-mentioned openings within which said rolls rest and said flanges extending inwardly over the edges of said ring member, and means for preventing relative motion of said ring member and said cylindrical member.

16. In construction for anti-friction bearings, in combination, a cylindrical member having inwardly extending flanges and regularly spaced openings in its main body portion, the walls of said openings being beveled in an outward direction toward each other, a set of rolls lying within said openings, said rolls having a larger diameter than the width of said openings, a plurality of arc shaped members having openings corresponding in position to said first-mentioned openings and lying against the main body portion of said cylindrical member between said flanges so that the openings thereof correspond in position to the openings of said cylindrical member, and a resilient arc shaped member having openings similar to the openings in said cylindrical member and adapted to be snapped into position between said flanges against the main body portion of said cylindrical member so that the openings thereof correspond to some of the openings in said cylindrical member and so that its opposite ends abut against the ends of said first-mentioned arc shaped members, said flanges overlapping the edges of said first-mentioned arc shaped members and said resilient arc shaped member.

17. In construction for anti-friction bearings, in combination, a cylindrical member having inwardly extending flanges and regularly spaced openings in its main body portion, the walls of said openings being beveled in an outward direction toward each other, a set of rolls lying within said openings, said rolls having a larger diameter than the width of said openings, a plurality of arc shaped members having openings corresponding in position to said first-mentioned openings and lying against the main body portion of said cylindrical member between said flanges so that the openings thereof correspond in position to the openings in said cylindrical member, a resilient arc shaped member having openings similar to the openings in said cylindrical member and adapted to be snapped into position between said flanges against the main body portion of said cylindrical member so that the openings thereof correspond to some of the openings in said cylindrical member and so that its opposite ends abut against the ends of said first-mentioned arc shaped members, and a lug extending from one of said arc shaped members into a corresponding slot in said cylindrical member to prevent relative movement therebetween.

In testimony whereof, I have signed my name to this specification this 12th day of November, 1929.

HOWARD I. BEARD.